US011249702B2

(12) United States Patent
Miyazaki et al.

(10) Patent No.: US 11,249,702 B2
(45) Date of Patent: Feb. 15, 2022

(54) MANAGEMENT SYSTEM AND INFORMATION MANAGEMENT METHOD

(71) Applicant: TOSHIBA TEC KABUSHIKI KAISHA, Tokyo (JP)

(72) Inventors: Sou Miyazaki, Sunto Shizuoka (JP); Hiroyo Tanaka, Tokyo (JP); Kazuhiro Ogura, Hiratsuka Kanagawa (JP); Masaki Narahashi, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/824,561

(22) Filed: Mar. 19, 2020

(65) Prior Publication Data

US 2020/0371730 A1 Nov. 26, 2020

(30) Foreign Application Priority Data

May 24, 2019 (JP) .............................. JP2019-097921

(51) Int. Cl.
*G06F 3/12* (2006.01)
*G03G 15/08* (2006.01)

(52) U.S. Cl.
CPC ....... *G06F 3/1235* (2013.01); *G03G 15/0863* (2013.01); *G06F 3/121* (2013.01);
(Continued)

(58) Field of Classification Search
CPC ...... G06F 3/1235; G06F 3/121; G06F 3/1284; G06F 3/1296; G06F 3/1203;
(Continued)

(56) References Cited

U.S. PATENT DOCUMENTS

| 7,130,559 B2 | 10/2006 | Kimura et al. |
| 2002/0077979 A1* | 6/2002 | Nagata ................. G06Q 10/087 705/40 |

(Continued)

FOREIGN PATENT DOCUMENTS

| JP | 2005284569 A | 10/2005 |
| JP | 2008-185824 A | 8/2008 |

OTHER PUBLICATIONS

Extended European Search Report dated Oct. 9, 2020 in corresponding European Patent Application No. 20170068.9, 8 pages.

*Primary Examiner* — Miya J Williams
*Assistant Examiner* — Darryl V Dottin
(74) *Attorney, Agent, or Firm* — Kim & Stewart LLP

(57) ABSTRACT

A management system includes an information processing apparatus that stores management information about cartridges that store consumables and is configured to update the stored management information, and an image forming apparatus configured to print an image on a sheet using the consumables stored in an attached cartridge, storing cartridge information about a cartridge that has been previously attached to the image forming apparatus, and configured to, when a cartridge is attached, retrieve cartridge information from the attached cartridge as first cartridge information and the stored cartridge information as second cartridge information, and transmit the first and second cartridge information to the processing apparatus. Upon receipt of the cartridge information, the processing apparatus determines whether the attached cartridge is a refilled cartridge, and if so, updates the management information so that the cartridge is identified as a refilled cartridge. The processing apparatus transmits a determination result to the image forming apparatus.

18 Claims, 7 Drawing Sheets

(52) U.S. Cl.
CPC .......... *G06F 3/1284* (2013.01); *G06F 3/1296* (2013.01); *G06F 3/1201* (2013.01); *G06F 3/1204* (2013.01)

(58) Field of Classification Search
CPC .... G06F 3/1219; G06F 3/1229; G06F 3/1285; G03G 15/0863; G03G 15/5079; G03G 21/181; G03G 21/1878
USPC ........................................................ 358/1.15
See application file for complete search history.

(56) References Cited

U.S. PATENT DOCUMENTS

| | | |
|---|---|---|
| 2006/0051106 A1 | 3/2006 | Takahashi et al. |
| 2014/0043406 A1* | 2/2014 | Mizutani ............. B41J 2/17506 347/86 |

* cited by examiner

| CARTRIDGE IDENTIFICATION DATA | T001 |
|---|---|
| PRINTING COUNTER | 101 |
| REUSE FLAG | False |
| REPLACEMENT FLAG | False |
| REFILL FLAG | False |

MANAGEMENT SYSTEM AND INFORMATION MANAGEMENT METHOD

CROSS-REFERENCE TO RELATED APPLICATIONS

This application is based upon and claims the benefit of priority from Japanese Patent Application No. 2019-097921, filed on May 24, 2019, the entire contents of which are incorporated herein by reference.

FIELD

Embodiments relate to a management system and an information management method.

BACKGROUND

In recent years, image forming apparatuses have been developed for managing information about consumables used thereby. For example, a Radio Frequency Identification (RFID) tag is attached to a toner cartridge for storing information on the toner. However, such information has been limited to be read by the image forming apparatus alone. Therefore, it has been difficult for a manufacturer or a maintenance provider of image forming apparatuses to monitor the conditions of the consumables and provide timely offers for services related to the consumables.

DETAILED DESCRIPTION

One or more embodiments provide a management system comprising an information processing apparatus including a first storage device that stores management information about cartridges that store consumables used for printing, and a first controller configured to update the stored management information, and an image forming apparatus including a printer configured to print an image on a sheet using the consumables stored in a cartridge attached to the image forming apparatus, the cartridge storing cartridge information about the cartridge, a second storage device that stores cartridge information about a cartridge that has been previously attached to the image forming apparatus, and a second controller configured to when a cartridge is attached to the image forming apparatus, retrieve cartridge information from the attached cartridge as first cartridge information, and further retrieve the cartridge information stored in the second storage device as second cartridge information, and transmit the first and second cartridge information to the information processing apparatus. The first controller is configured to, upon receipt of the first and second cartridge information, determine whether or not the cartridge attached to the image forming apparatus is a refilled cartridge, upon determining that the cartridge is a refilled cartridge, update the management information so that the cartridge is identified as a refilled cartridge, and transmit a result of the determination to the image forming apparatus.

Figure 1:
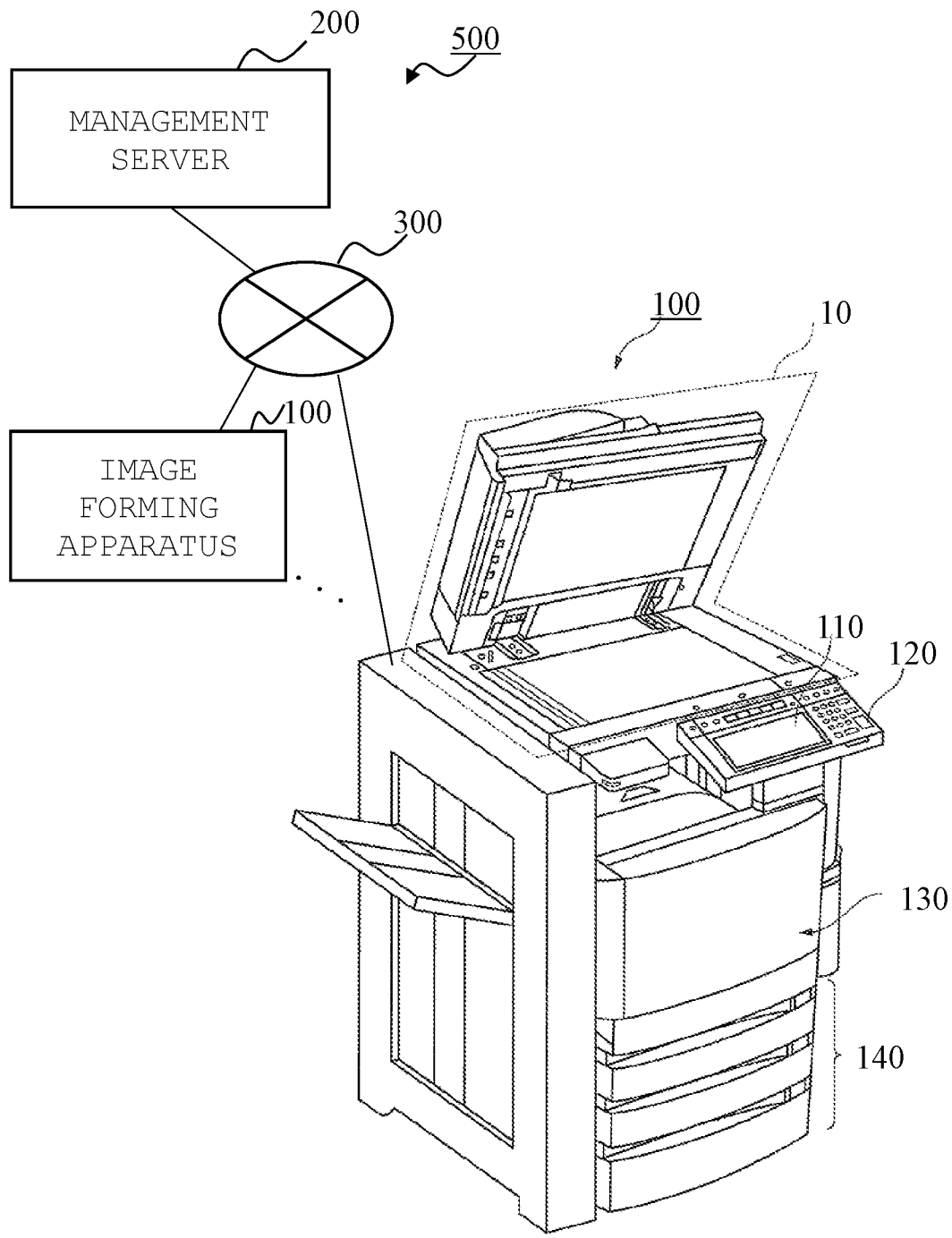
FIG. 1 is a diagram showing a configuration of a management system according to an embodiment.

A description system, an information management method and a cartridge according to embodiments will now be described with reference to the accompanying drawings. FIG. 1 is a diagram illustrating a configuration of a management system 500 according to an embodiment. The management system 500 includes a plurality of image forming apparatuses 100 and a management server 200. The image forming apparatus 100 is an apparatus for forming an image on a sheet by using consumables. The image forming apparatus 100 is, for example, a multi-function peripheral. The management server 200 is an information processing apparatus for storing information about the consumables used in each image forming apparatus 100. The image forming apparatus 100 and the management server 200 are communicably connected to each other via a network 300. Hereinafter, the respective apparatuses will be described in detail.

Figure 2:
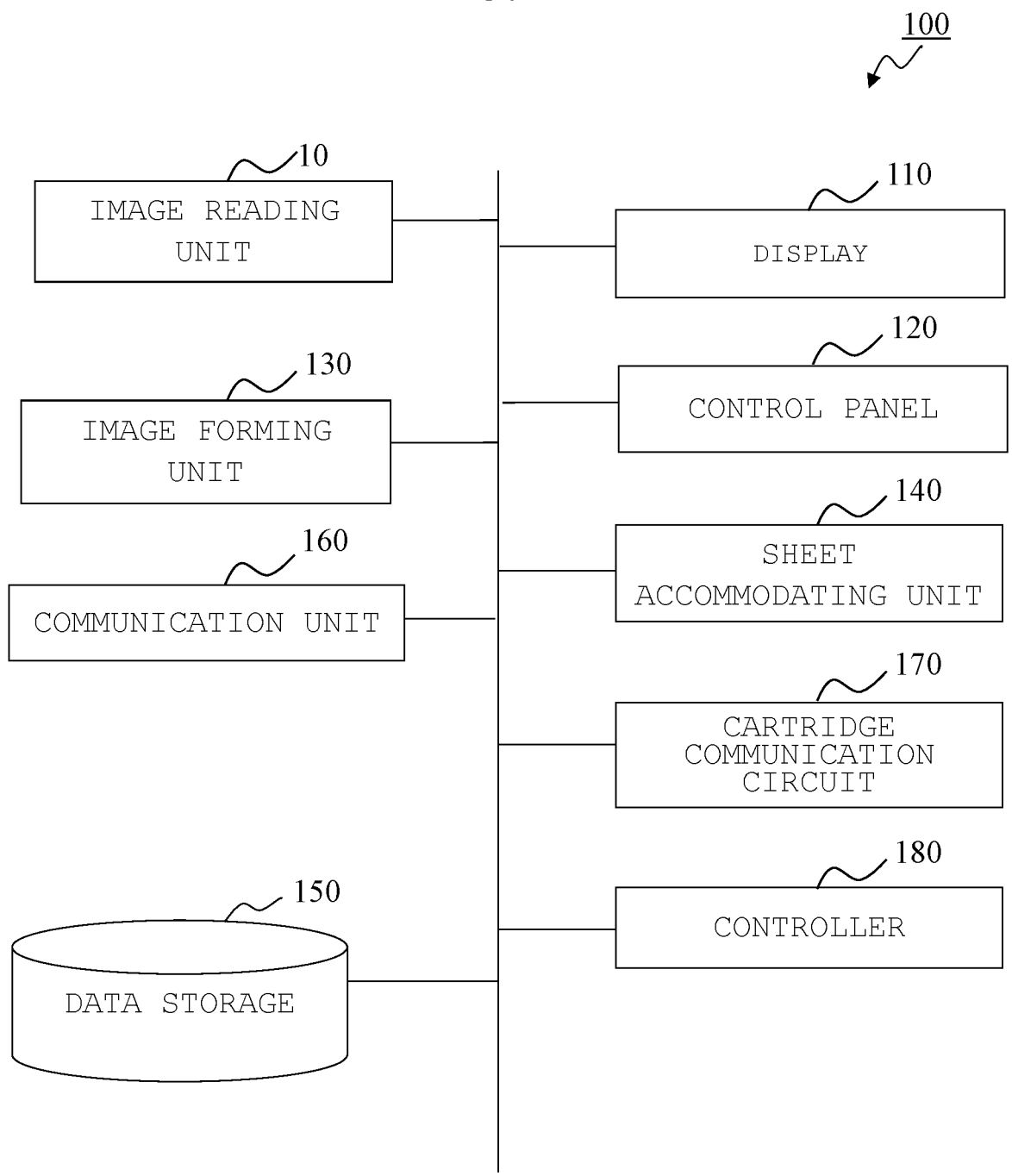
FIG. 2 is a hardware block diagram of an image forming apparatus according to the embodiment.

FIG. 2 is a hardware block diagram of the image forming apparatus 100. First, the image forming apparatus 100 will be described in detail with reference to FIGS. 1 and 2. The image forming apparatus 100 includes an image reading unit 10, a display 110, a control panel 120, an image forming unit 130, a sheet accommodating unit 140, a data storage 150, a communication unit 160, a cartridge communication circuit 170, and a controller 180.

The image forming apparatus 100 forms an image on a sheet by using a developer such as toner or ink. When the developer is a toner, the developer is heated to fix the developer to the sheet. When the developer is ink, the developer is dropped onto the sheet to form an image on the sheet. The sheet may be, for example, paper or label paper. The sheet may be any material that is capable of forming an image on the surface thereof by the image forming apparatus 100. Examples of the toner include a decolorizing toner, a non-decoloring toner (i.e., an ordinary toner), and a decorative toner. The developer is one of the specific examples of consumables used in image forming apparatus 100. The developer is contained in a cartridge which is a specific container.

The cartridge contains consumables used in the image forming apparatus 100, and is removable from image forming apparatus 100. The cartridge has a cartridge memory. The cartridge memory stores cartridge information. The cartridge information includes information relating to the developer to be contained and information about the cartridge. The cartridge information includes, for example, identification data (hereinafter, referred to as "cartridge identification data") assigned to the cartridge in advance.

The image reading unit 10 reads image information from a medium as light and dark of light. The image reading unit 10 records the image information that has been read. The recorded image information may be transmitted to another information processing apparatus via the network. The recorded image information may be imaged onto the sheet by the image forming unit 130.

The display 110 is an image display device such as a liquid crystal display, an organic EL (Electro Luminescence) display, or the like. The display 110 displays various information about the image forming apparatus 100.

The image forming unit 130 forms an image on a sheet based on image information generated by the image reading unit 10 or image information received via the network. The image forming unit 130 includes, for example, a developing unit, a transfer device, and a fixing device. The image forming unit 130 forms an image by, for example, the following processing. The developing unit of the image forming unit 130 forms an electrostatic latent image on the photosensitive drum based on the image information. The developing unit of the image forming unit 130 forms a visible image by attaching a developer to an electrostatic latent image.

The transfer unit of the image forming unit 130 transfers the visible image onto the sheet. The fixing device of the image forming unit 130 fixes the visible image on the sheet by heating and pressing the sheet. The sheet on which the image is formed may be a sheet accommodated in the sheet accommodating unit 140, or may be a manually inserted sheet.

The sheet accommodating unit 140 accommodates a sheet used for image formation in the image forming unit 130.

The data storage 150 is a storage device such as a magnetic hard disk device or a semiconductor storage device (e.g., a Solid State Drive (SSD)). The data storage 150 stores data that is needed when the image forming apparatus 100 operates. The data storage 150 may temporarily store the image data of the image formed in image forming apparatus 100. The data storage 150 stores, for example, previous cartridge information. The previous cartridge information is cartridge information stored and updated every time a new cartridge is attached to the image forming apparatus 100 and checked. Therefore, the previous cartridge information indicates the cartridge that has been previously attached to the apparatus. The previous cartridge information includes, for example, information relating to a developer contained in the cartridge to which the cartridge is attached, and cartridge identification data of the cartridge. The previous cartridge information may have the same configuration as that of the cartridge information stored in the cartridge memory. The cartridge information and the previous cartridge information are recorded based on the check result performed at the same timing.

The communication unit 160 is a communication interface configured to communicate with other devices (e.g., the management server 200) via the network 300.

The cartridge communication circuit 170 is an interface circuit configured to communicates with the cartridge attached to the image forming apparatus 100. The cartridge communication circuit 170 may communicate with the cartridge memory to obtain information recorded therein. The cartridge communication circuit 170 performs processing of writing new information to the cartridge memory and deleting the recorded information by communicating with the cartridge memory. The cartridge communication circuit 170 may communicate with the cartridge memory using, for example, short range wireless communication (e.g., RFID). The cartridge communication circuit 170 may perform wired communication or contact communication via terminals provided in a cartridge, for example.

The controller 180 is configured by using a processor such as a Central Processing Unit (CPU) and a memory. The controller 180 reads and executes a program stored in advance in the data storage 150. The controller 180 controls the operation of each device included in the image forming apparatus 100.

Figures 3, 4:
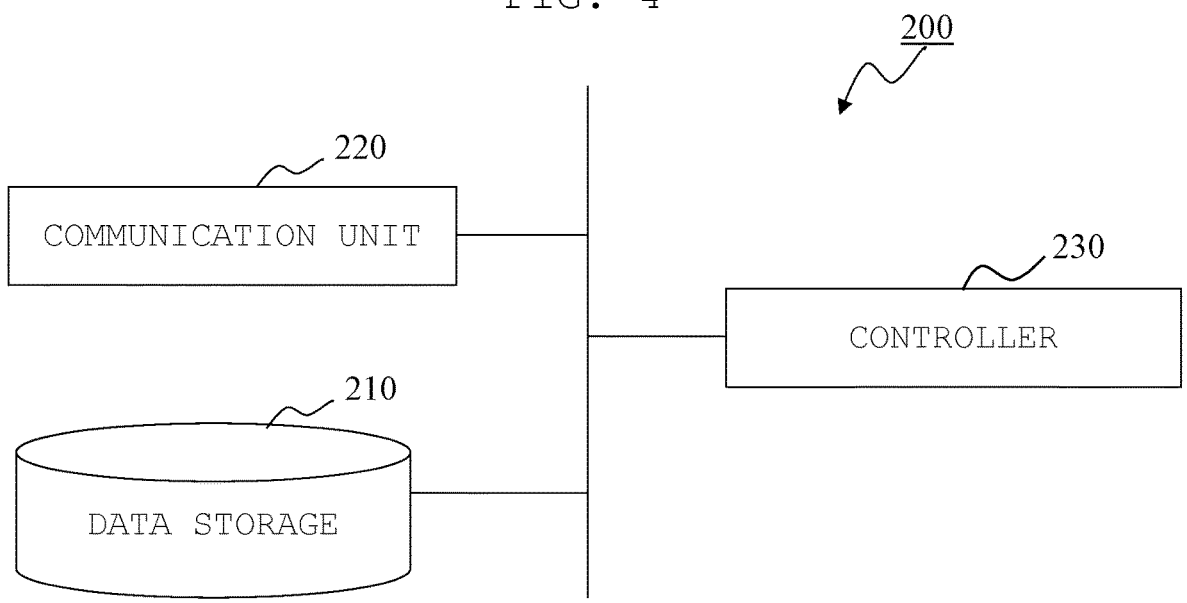
FIG. 3 is a diagram showing an example of cartridge information.
FIG. 4 is a hardware block diagram of a management server of the management system.

FIG. 3 is a diagram showing an example of the cartridge information. The cartridge information includes, for example, a cartridge identification data value, specific information such as a printing counter value, a reuse flag, a replacement flag, and a refill flag. The cartridge identification data is identification data of the cartridge. The printing counter value is one example of the specific information and is a value indicating the number of pages printed in the image forming apparatus 100 in which the cartridge is mounted.

The specific information is information used to determine whether or not the cartridge is a cartridge that has been continuously attached to the image forming apparatus 100. The specific information may be any information as long as the determination described above can be performed with a predetermined accuracy. The specific information may be, for example, information indicating the date and time at which the cartridge is attached to the image forming apparatus 100. The specific information may be, for example, identification data (hereinafter referred to as "body identification data") of the image forming apparatus 100 to which the cartridge is attached. The specific information may be information indicating a history (for example, an empty warning or a near empty warning) of a warning output in the past with respect to the consumables contained in the cartridge. The specific information may be, for example, information indicating the remaining amount of the developer contained in the cartridge, or may be information indicating the amount used.

The reuse flag is a value indicating whether or not the cartridge is a reused cartridge. The reused cartridge is a legitimate product and originally contains the consumables, but has been used by an image forming apparatus 100 and subsequently used by another image forming apparatus 100. When it is determined that the cartridge is reused, the value of the reuse flag is updated from the value of False to the value of True.

The replacement flag is a value indicating that the cartridge that has been previously mounted and the cartridge that is currently mounted are different from each other. That is, when the cartridge which has been mounted on the image forming apparatus 100 immediately before and the cartridge being checked are different, it is determined that the cartridge has been replaced. When such a determination is made, the value of the replacement flag is updated from the value of False to the value of True.

The refill flag is a value indicating whether or not the cartridge is a cartridge to which the cartridge is refilled. Refill means that the cartridge itself was a legitimate product and originally contained normal product consumables, but was refilled with non-compliant consumable after used by a certain image forming apparatus 100. When it is determined that refill is performed, the value of the refill flag is updated from the value of False to the value of True.

FIG. 4 is a hardware block diagram of the management server 200. Next, the details of the management server 200 will be described. The management server 200 includes a data storage 210, a communication unit 220, and a controller 230.

The data storage 210 is a storage device such as a magnetic hard disk device or a semiconductor storage device. The data storage 210 stores data that is needed when the management server 200 operates. The data storage 210 stores previous cartridge information for each image forming apparatus 100 with respect to the plurality of image forming apparatuses 100.

The communication unit 220 is a communication interface configured to communicate with other devices (e.g., image forming apparatuses 100) via the network 300.

The controller 230 comprises a processor such as a CPU and a memory. The controller 230 reads and executes a program stored in advance in the data storage 210. The controller 230 controls the operation of each device included in the management server 200.

Figure 5:
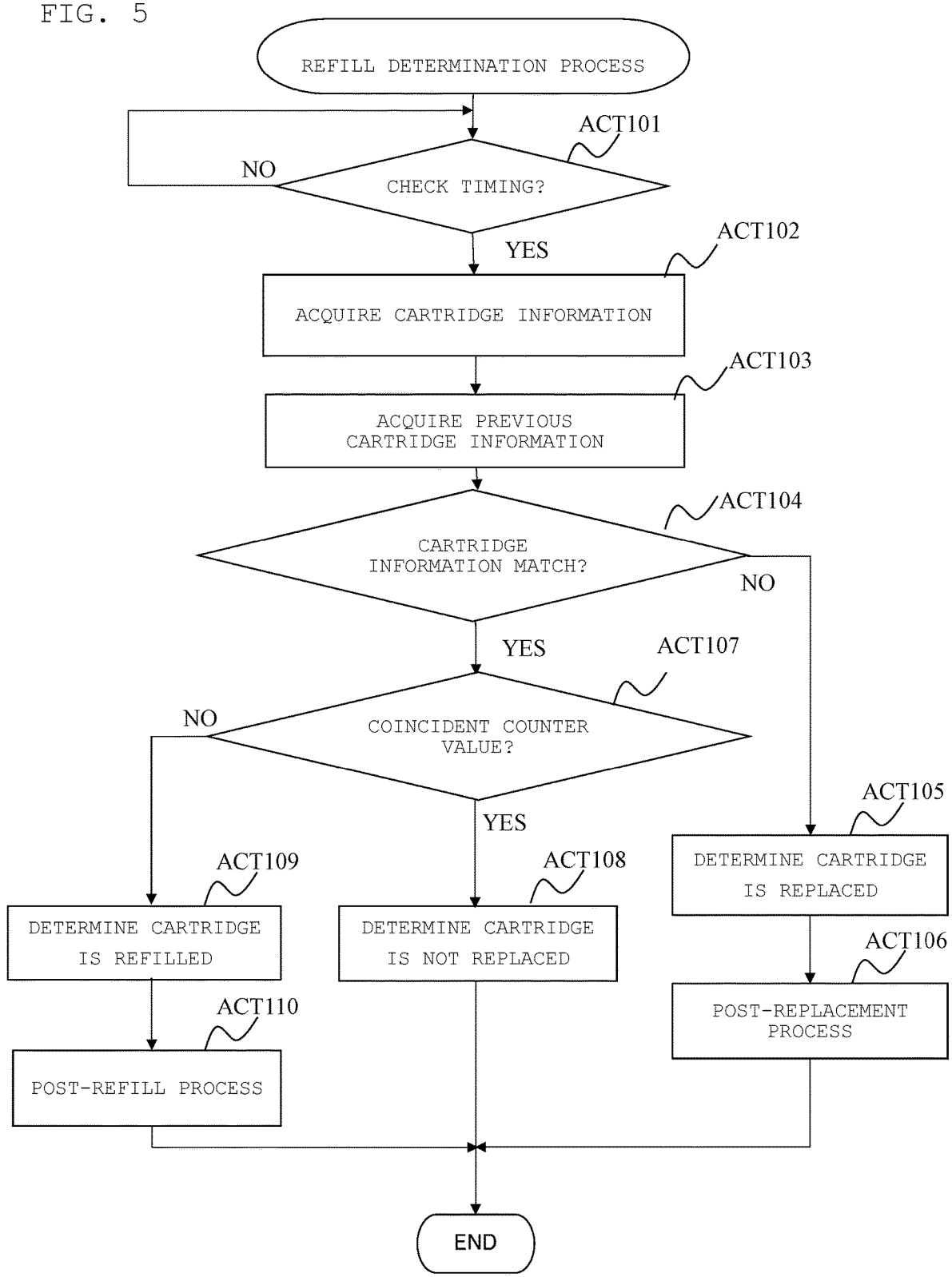
FIG. 5 is a flowchart of a refill determination process performed by the image forming apparatus.

FIG. 5 is a flow diagram of a refill determination process performed by the image forming apparatus 100. The controller 180 of the image forming apparatus 100 does not execute the refill determination process until a predetermined check timing arrives (ACT 101, NO). The predetermined check timing is a timing at which a predetermined condition in which the cartridge of the consumables is likely to be replaced is satisfied. The predetermined check timing is, for example, a timing when the power supply is switched from the off state to the on state, a timing when the power supply is returned from the sleep state, a timing after the cartridge replacement door is opened, and a timing when the cartridge is removed once.

When the check timing arrives (ACT 101, YES), the controller 180 acquires cartridge information stored in the cartridge memory (ACT 102). The controller 180 acquires the cartridge information by, for example, the following processing. The controller 180 instructs the cartridge communication circuit 170 to read the cartridge information. The cartridge communication circuit 170 communicates with the cartridge memory in response to the instruction to read the cartridge information stored in the cartridge memory. The cartridge communication circuit 170 outputs the cartridge information that has been read to the controller 180. The controller 180 receives the cartridge information from the cartridge communication circuit 170.

The controller 180 obtains the previous cartridge information (ACT 103). For example, the controller 180 may obtain the previous cartridge information from the data storage 150.

The controller 180 determines whether or not the cartridge identification data included in the cartridge information matches the cartridge identification data included in the previous cartridge information (ACT 104). When the cartridge identification data do not match (ACT 104, NO), the controller 180 determines that the cartridge has been replaced (ACT 105). In this case, the controller 180 executes a predetermined post-exchange process (ACT 106). The controller 180 executes the following processing, for example, in the post-exchange processing. The controller 180 changes the value of the replacement flag from False to True in the cartridge information stored in the cartridge memory and the previous cartridge information stored in the data storage 150. The controller 180 transmits to the management server 200 cartridge exchange event notification together with the body identification data of the image forming apparatus 100. The cartridge replacement event notification is information indicating that the cartridge has been replaced. When the controller 230 of the management server 200 receives the cartridge exchange event notification, it records information indicating the date and time when the cartridge exchange event notification is received, information indicating that the cartridge has been exchanged, and the body identification data is recorded in the data storage 210.

When the cartridge identification data match in ACT 104 (ACT 104, YES), the controller 180 determines whether or not the counter value included in the cartridge information matches the counter value included in the previous cartridge information (ACT 107). When the counter values coincide with each other (ACT 107, YES), the controller 180 determines that the cartridge is not replaced (ACT 108).

On the other hand, when the counter values do not coincide with each other (ACT 107, NO), the controller 180 determines that the cartridge has been refilled (ACT 109). In this case, the controller 180 executes a predetermined post-refill process (ACT 110). The controller 180 executes the following processing, for example, in the post-refill processing. The controller 180 changes the value of the refill flag from False to true, in cartridge information stored in the cartridge memory, and in the previous cartridge information stored in the data storage 150. The controller 180 transmits a cartridge refill event notification together with the main identification data of the image forming apparatus 100. The cartridge refill event notification is information indicating that the cartridge has been refilled. When receiving the cartridge refill event notification, the controller 230 of the management server 200 records information indicating the date and time when the cartridge refill event notification is received, information indicating that the cartridge has been refilled, and the body identification data in the data storage 210.

Figure 6:
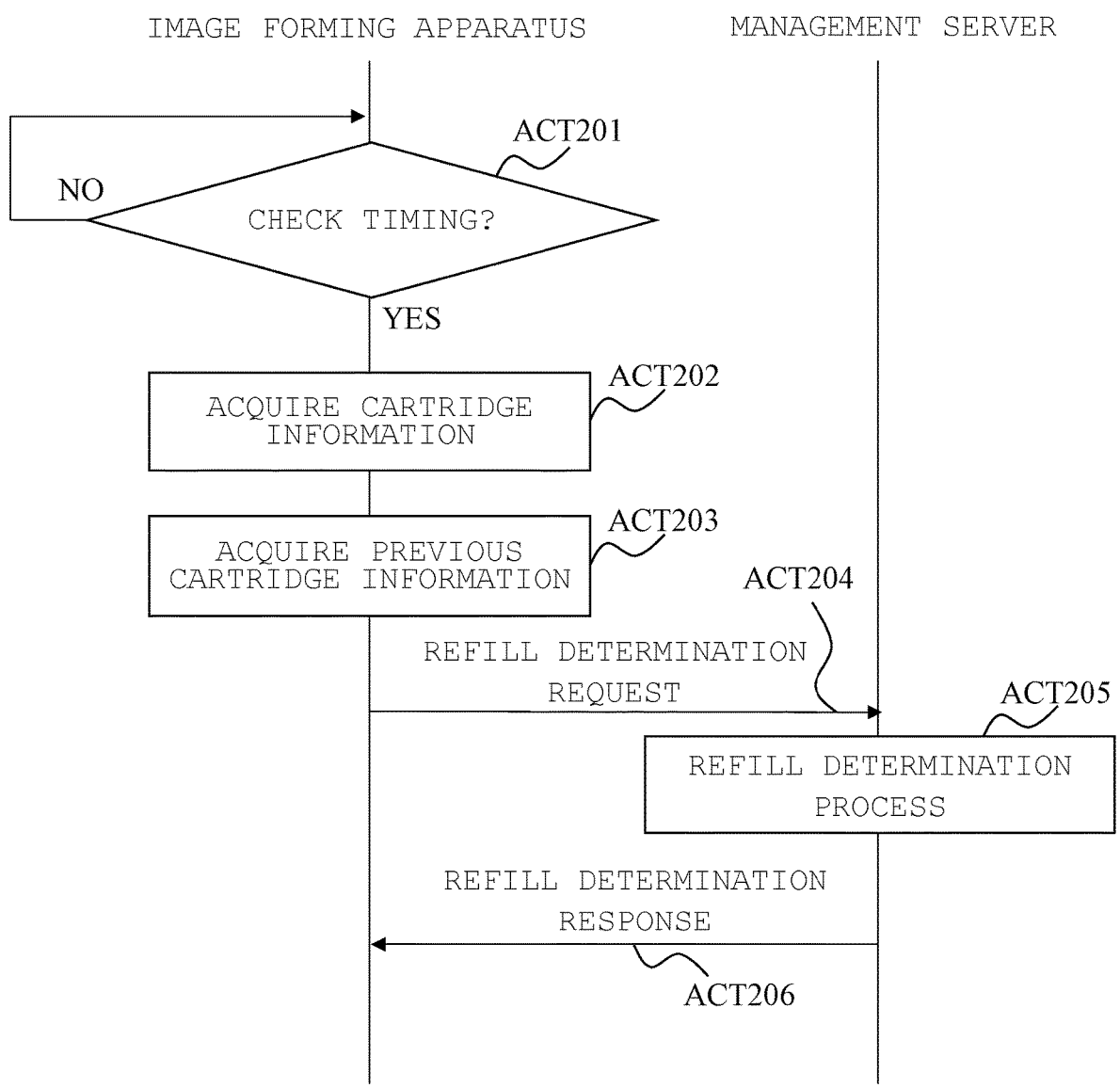
FIG. 6 is a sequence chart of operations performed by the management system when the refill determination process is executed in the management server.

FIG. 6 is a sequence chart of the flow of the operation of the management system 500 when the refill determination process is executed in the management server 200. The controller 180 of the image forming apparatus 100 waits until a predetermined check timing arrives (ACT 201, NO). The predetermined check timing is a timing at which a predetermined condition in which the cartridge of the consumables is likely to be replaced is satisfied. Specific examples of the predetermined check timing are the same as those described with reference to FIG. 5.

When the check timing arrives (ACT 201, YES), the controller 180 acquires cartridge information stored in the cartridge memory (ACT 202). The controller 180 also acquires the previous cartridge information (ACT 203). An example of a specific processing for acquiring the cartridge information and the previous cartridge information by the controller 180 is similar to the processing shown in FIG. 5. The controller 180 generates a refill determination request including the acquired cartridge information and the previous cartridge information. The refill determination request is information indicating that the execution of the refill determination using the cartridge information and the previous cartridge information is requested. The controller 180 transmits the refill determination request to the management server 200 (ACT 204).

The controller 230 of the management server 200 records the cartridge information and the previous cartridge information included in the refill determination request in the data storage 210 when receiving the refill determination request. At this time, the controller 230 may further record the body identification data included in the refill determination request.

The controller 230 executes the refill determination process based on the cartridge information and the previous cartridge information included in the refill determination request. The refill determination process performed by the controller 230 is similar to ACT 104 through ACT 110 of FIG. 5. However, the controller 230 updates the value of the replacement flag of the cartridge information and the previous cartridge information recorded in the data storage 210 of the own apparatus in the post-exchange processing (ACT 106). Also, the controller 230 updates the value of the cartridge information stored in the data storage 210 and the value of the refill flag of the previous cartridge information in the post-refill processing (ACT 110). The controller 230 generates a refill determination response including a determination result in the refill determination process. Then, the controller 230 transmits the refill judgment response to the image forming apparatus 100 which is the transmission source of the refill determination request (ACT 206).

When the controller 180 of the image forming apparatus 100 receives the refill determination response, it updates the cartridge information and the previous cartridge information based on the contents of the received refill determination response. For example, if determined to be replaced, the controller 180 updates each of the values of the cartridge information and the replacement flag of the previous cartridge information from False to True. For example, when it is determined that refill is made, the controller 180 updates each value of the cartridge information and the refill flag of the previous cartridge information from False to True.

Figure 7:
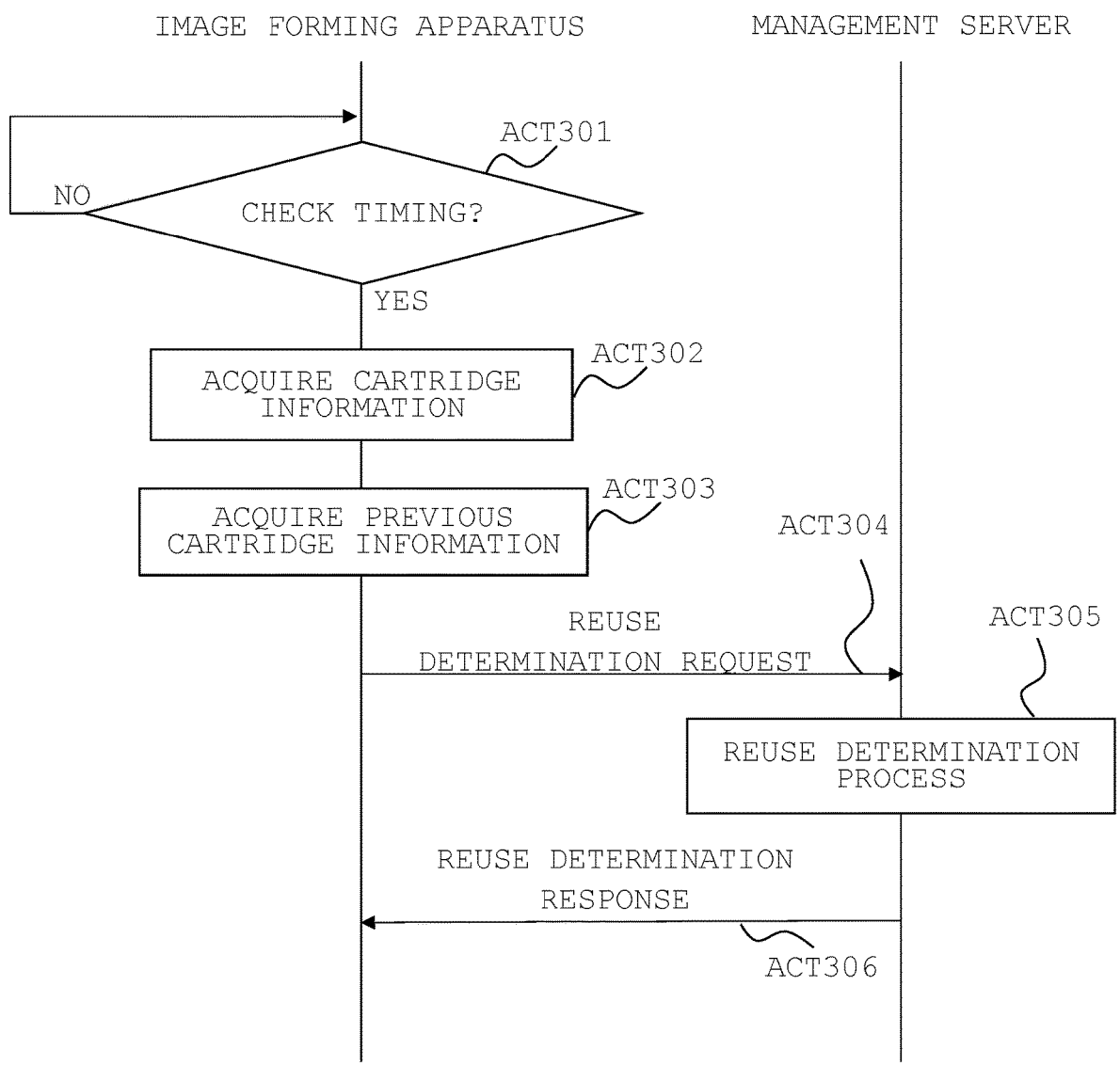
FIG. 7 is a sequence chart of the operations performed by the management system when a reuse determination process is executed in the management server.

FIG. 7 is a sequence chart of the operation flow of the management system 500 when a reuse determination process is executed in the management server 200. The controller 180 of the image forming apparatus 100 waits until a predetermined check timing arrives (ACT 301, NO). The predetermined check timing is a timing at which a predetermined condition in which the cartridge of the consumables is likely to be replaced is satisfied. Specific examples of the predetermined check timing are the same as those described with reference to FIG. 5.

When the check timing arrives (ACT 301, YES), the controller 180 acquires cartridge information stored in the cartridge memory (ACT 302). The controller 180 also acquires the previous cartridge information (ACT 303). An example of a specific processing for acquiring the cartridge information and the previous cartridge information by the controller 180 is similar to the processing shown in FIG. 5. The controller 180 generates a reuse determination request that includes the acquired cartridge information and the previous cartridge information. The reuse determination request is information indicating that the execution of the reuse determination using the cartridge information and the previous cartridge information is requested. The controller 180 sends the reuse determination request to the management server 200 (ACT 304).

When receiving the reuse determination request, the controller 230 of the management server 200 records the cartridge information and the previous cartridge information included in the reuse determination request in the data storage 210. At this time, the controller 230 may further record the body identification data included in the reuse determination request. The controller 230 executes the reuse determination process based on the cartridge information and the previous cartridge information included in the reuse determination request.

Figure 8:
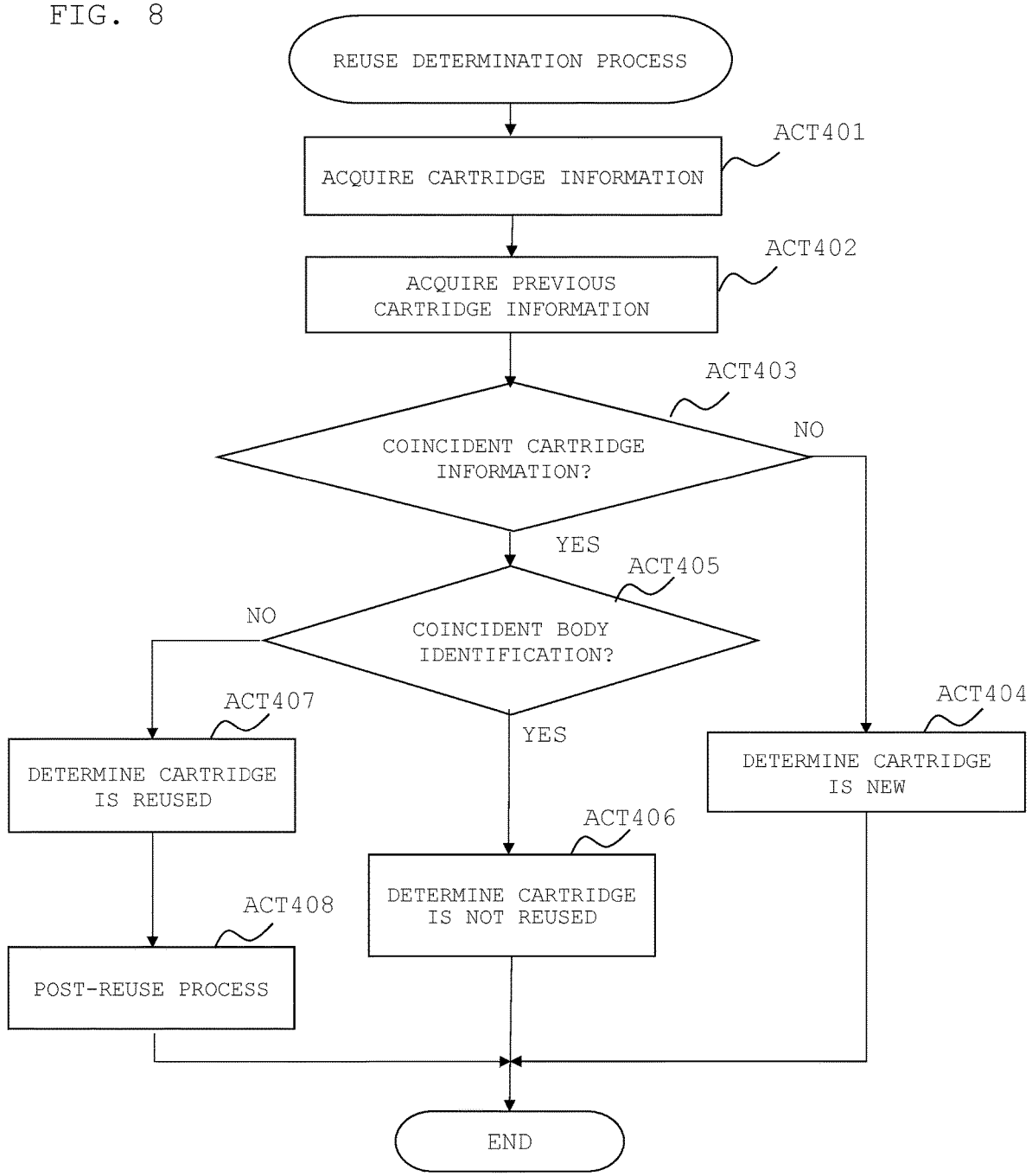
FIG. 8 is a flowchart illustrating the reuse determination process performed by the management server.

Here, the reuse determination process will be described. FIG. 8 is a flowchart illustrating the reuse determination process performed by the management server 200. The controller 230 of the management server 200 acquires the cartridge information included in the received reuse determination request (ACT 401). The controller 230 also acquires the previous cartridge information for all the image forming apparatuses 100 stored in the data storage 210 (ACT 202).

The controller 230 determines whether or not the same information as the cartridge identification data included in the cartridge information exists in the cartridge identification data of all the previous cartridge information (ACT 403). When there is no matching cartridge identification data (ACT 403, NO), the controller 230 determines that the cartridge which is the subject of the reuse determination process is a new cartridge (ACT 404).

In ACT 403, when there is matched cartridge identification data (ACT 403, YES), the controller 230 determines whether or not the body identification data included in the reuse determination request and the body identification data included in the previous cartridge information included in the cartridge identification data which matches the main identification data included in the reuse determination request are coincident with each other (ACT 405). When the body identification data coincides with each other (ACT 405, YES), the controller 230 determines that the cartridge is not reused (ACT 406).

On the other hand, when the body identification data do not match (ACT 405, NO), the controller 230 determines that the cartridge has been reused (ACT 407). In this case, the controller 230 executes a predetermined post-reuse process (ACT 408). The controller 230 executes the following processing, for example, in the post-reuse processing. The controller 230 changes the value of the reuse flag from False to True in the cartridge information and previous cartridge information in which the body identification data is matched. The description of the reuse determination process shown in FIG. 8 is completed, and the process returns to the description of FIG. 7.

When the reuse determination process of ACT 305 ends, the controller 230 generates a reuse determination response that includes a determination result in the reuse determination process. Then, the controller 230 transmits the reuse determination response to the image forming apparatus 100 which is the transmission source of the reuse determination request (ACT 306).

When the controller 180 of the image forming apparatus 100 receives the reuse determination response, it updates the cartridge information and the previous cartridge information based on the contents of the received reuse determination response. For example, if it is determined that the cartridge has been reused, the controller 180 updates each value of the cartridge information and the reuse flag of the previous cartridge information from False to True.

All or a part of the operation of the controller 180 may be realized by using hardware such as an ASIC (Application Specific Integrated Circuit), a PLD (Programmable Logic Device), or an FPGA (Field Programmable Gate Array). The program may be recorded on a computer-readable recording medium. The computer-readable recording medium is, for example, a flexible disk, a magneto-optical disk, a portable medium such as a ROM, a CD-ROM, or the like, a storage device such as a hard disk device incorporated in a computer system, or the like. The program may be transmitted over a telecommunications line.

In accordance with at least one embodiment described above, information about the cartridge status of the consumables is sent to the management server 200 in the image forming apparatus 100. The management server 200 records information on the status of the cartridges of the consumables in the image forming apparatus 100. The manufacturers or maintenance service providers of the image forming apparatus 100 or the consumables can obtain information about the cartridge status of the consumables in the image forming apparatus 100 by referring to the information stored in the management server 200.

As a specific example of information relating to the cartridge status of the consumables, there is information about whether it has been exchanged, whether it has been refilled, whether it has been refreshed or not. Therefore, each of the above subjects can perform the processing on the basis of such information.

MODIFIED EXAMPLE

The definitions of the term "reuse" and "refill" may be made as follows. The reuse flag is a value indicating whether or not the cartridge has been used before. "Reuse" indicates that the cartridge itself is a legitimate product, originally containing the consumables, but is used by the image forming apparatus 100 of a certain user, and then used by the image forming apparatus 100 of the other user. The "user" in this description indicates a user of the image forming apparatus 100 or the cartridge. Whether or not the image forming apparatus 100 has been used by another user may be determined by, for example, the following processing. For example, identification data indicating the user of the image forming apparatus 100 to which the cartridge is attached may be used as the specific information. By using such identification as specific information, it is possible to determine whether the same user is used in image forming apparatus 100 or image forming apparatus 100 in management server 200. When it is determined that reuse has been performed, the value of the reuse flag is updated from the value of False to the value of True.

The replacement flag is a value indicating that the cartridge that has been previously mounted and the cartridge currently mounted are different from each other. That is, when the cartridge which has been mounted on the image forming apparatus 100 immediately before and the cartridge being checked are different, it is determined that the cartridge has been replaced. When such a determination is made, the value of the replacement flag is updated from the value of False to the value of True.

The refill flag is a value indicating whether or not the cartridge is a cartridge to which the cartridge is refilled. Refill indicates that the cartridge itself was a legitimate product and originally contained normal product consumables, but was used by a certain user's image forming apparatus 100, after which it is used by the same user's image forming apparatus 100 after the non-compliant consumables were filled. As long as the same user continues to use such a cartridge, it can be considered as being "refilled" even if the cartridge is used by different image forming apparatuses 100. When it is determined that the cartridge is refilled, the value of the refill flag is updated from the value of False to the value of True.

The image forming apparatus 100 may be configured to transmit the cartridge information and the previous cartridge information to the management server 200 at the time of the arrival of a predetermined check timing without specifying the refill determination process or the reuse determination process. In this case, the management server 200 may perform the refill determination process or the reuse determination process according to a predetermined condition. For example, the management server 200 may perform the reuse determination process and the refill determination process based on the information when the cartridge information and the previous cartridge information are received from the image forming apparatus 100. In this case, the management server 200 may execute the reuse determination process first, and then perform the refill determination process, or vice versa.

When the image forming apparatus 100 includes a plurality of cartridges, the refill determination process and the reuse determination process may be performed for each cartridge, or the refill determination process and the reuse determination process may be performed for a plurality of cartridges. When such determinations are made for a plurality of cartridges together, the determination process may be performed for each of the cartridges in a predetermined order, and when it is determined that the cartridge is reusable for any one of the cartridges, the determination result may be determined as the final determination result.

The consumables may be, for example, a photoreceptor drum. In the cartridge of the photosensitive drum used once, even when the interchangeable product in which the photosensitive member and the cleaning blade are replaced with non-genuine components is attached to the image forming apparatus 100 as a new cartridge, the above embodiment may also be applied. The cartridge is not necessarily limited to accommodating consumables. For example, the cartridge may be a device carrying consumables, for example, a photoreceptor drum. In this manner, the consumables of the present embodiment are not limited to that which is consumed and lost, and a material which is deteriorated by use may also be contained in the consumables.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The embodiments and variations thereof are included within the scope and spirit of the invention, and are included within the scope of the appended claims and their equivalents.

What is claimed:

1. A management system comprising:
an information processing apparatus including
a first memory that stores management information about cartridges that store consumables used for printing, and
a first controller configured to update the stored management information; and
an image forming apparatus including:
a printer configured to print an image on a sheet using the consumables stored in a cartridge attached to the image forming apparatus,
a second memory that stores cartridge information about a cartridge that has been previously attached to the image forming apparatus, the cartridge information including an identification and a used amount of consumables of the cartridge, and
a second controller configured to
when a cartridge is attached to the image forming apparatus, retrieve cartridge information from the attached cartridge as first cartridge information, and further retrieve the cartridge information stored in the second memory as second cartridge information, and
transmit the first and second cartridge information to the information processing apparatus,
wherein the first controller is configured to
upon receipt of the first and second cartridge information, compare the first and second cartridge information and determine whether or not the cartridge attached to the image forming apparatus is a refilled cartridge using a comparison result of the identifications and the used amounts of consumables included in the first and second cartridge information, upon determining that the cartridge is a refilled cartridge, update the management information so that the cartridge is identified as a refilled cartridge, and transmit a result of the determination to the image forming apparatus.

2. The management system according to claim 1, wherein the refilled cartridge is a genuine cartridge in which consumables contained therein have been refilled after use.

3. A management system comprising:
an information processing apparatus including
  a first memory that stores management information about cartridges that store consumables used for printing, and
  a first controller configured to update the stored management information; and
an image forming apparatus including:
  a printer configured to print an image on a sheet using the consumables stored in a cartridge attached to the image forming apparatus, the cartridge storing cartridge information about the cartridge,
  a second memory that stores cartridge information about a cartridge that has been previously attached to the image forming apparatus, and
  a second controller configured to
    when a cartridge is attached to the image forming apparatus, retrieve cartridge information from the attached cartridge as first cartridge information, and further retrieve the cartridge information stored in the second memory as second cartridge information, and
    transmit the first and second cartridge information to the information processing apparatus, wherein
the first controller is configured to
  upon receipt of the first and second cartridge information, determine whether or not the cartridge attached to the image forming apparatus is a refilled cartridge,
  upon determining that the cartridge is a refilled cartridge, update the management information so that the cartridge is identified as a refilled cartridge, and transmit a result of the determination to the image forming apparatus,
each of the first and second cartridge information indicates an identification of the cartridge and a used amount of the consumables, and
the first controller determines that the cartridge is a refilled cartridge when the identifications of the first and second cartridge information are identical but the used amounts of the consumables of the first and second cartridge information are different.

4. The management system according to claim 1, wherein upon receipt of the result of the determination indicating that the cartridge is a refilled cartridge, the second controller updates the cartridge information stored in the attached cartridge and the cartridge information stored in the second memory so that the cartridge is identified as a refilled cartridge.

5. The management system according to claim 1, wherein the first controller is further configured to
  upon receipt of the first and second cartridge information, determine whether or not the cartridge attached to the image forming apparatus is a reused cartridge,
  upon determining that the cartridge is a reused cartridge, update the management information so that the cartridge is identified as a reused cartridge, and transmit a result of the determination to the image forming apparatus.

6. The management system according to claim 5, wherein the reused cartridge is a genuine cartridge that has been used by another image forming apparatus.

7. The management system according to claim 1, wherein the cartridge is a toner cartridge containing toner.

8. The management system according to claim 1, wherein the cartridge includes a photosensitive drum containing a photoreceptor.

9. A method performed by a management system including an information processing apparatus and an image forming apparatus, the method comprising:
storing in the information processing apparatus management information about cartridges that store consumables used for printing;
storing in the image forming apparatus cartridge information about a cartridge that has been previously attached to the image forming apparatus;
when a cartridge is attached to the image forming apparatus, retrieving cartridge information including an identification and a used amount of consumables of the cartridge from the cartridge as first cartridge information, and further retrieving cartridge information stored in the image forming apparatus as second cartridge information;
transmitting the first and second cartridge information from the image forming apparatus to the information processing apparatus;
upon receipt of the first and second cartridge information, comparing the first and second cartridge information and determining whether or not the cartridge attached to the image forming apparatus is a refilled cartridge using a comparison result of the identifications and the used amounts of consumables included in the first and second cartridge information;
upon determining that the cartridge is a refilled cartridge, updating the management information so that the cartridge is identified as a refilled cartridge; and
transmitting a result of the determination from the information processing apparatus to the image forming apparatus.

10. The method according to claim 9, wherein
the refilled cartridge is a genuine cartridge in which consumables contained therein have been refilled after use.

11. The method according to claim 9, wherein
the cartridge is determined to be a refilled cartridge when the identifications of the first and second cartridge information are identical but the used amounts of the consumables of the first and second cartridge information are different.

12. The method according to claim 9, further comprising:
upon receipt of the result of the determination indicating that the cartridge is a refilled cartridge, updating the cartridge information stored in the attached cartridge and the cartridge information stored in the image forming apparatus so that the cartridge is identified as a refilled cartridge.

13. The method according to claim 9, further comprising:
upon receipt of the first and second cartridge information, determining whether or not the cartridge attached to the image forming apparatus is a reused cartridge;

upon determining that the cartridge is a reused cartridge, updating the management information so that the cartridge is identified as a reused cartridge; and transmitting a result of the determination from the image processing apparatus to the image forming apparatus.

14. The method according to claim 13, wherein
the reused cartridge is a genuine cartridge that has been used by another image forming apparatus.

15. The method according to claim 9, wherein
the cartridge is a toner cartridge containing toner.

16. The method according to claim 9, wherein
the cartridge includes a photosensitive drum containing a photoreceptor.

17. The management system according to claim 1, wherein
the used amount of consumables of the cartridge is a count of pages that have been printed using the consumables, and the cartridge is determined to be a refilled cartridge when the identifications of the first and second cartridge information are identical but the count of pages of the first cartridge information is less than the count of pages of the second cartridge information.

18. The management system according to claim 1, wherein the second memory stores the cartridge information further including a first flag for indicating whether or not the cartridge is refilled and a second flag for indicating whether or not the cartridge is reused.

* * * * *